Figure 1:
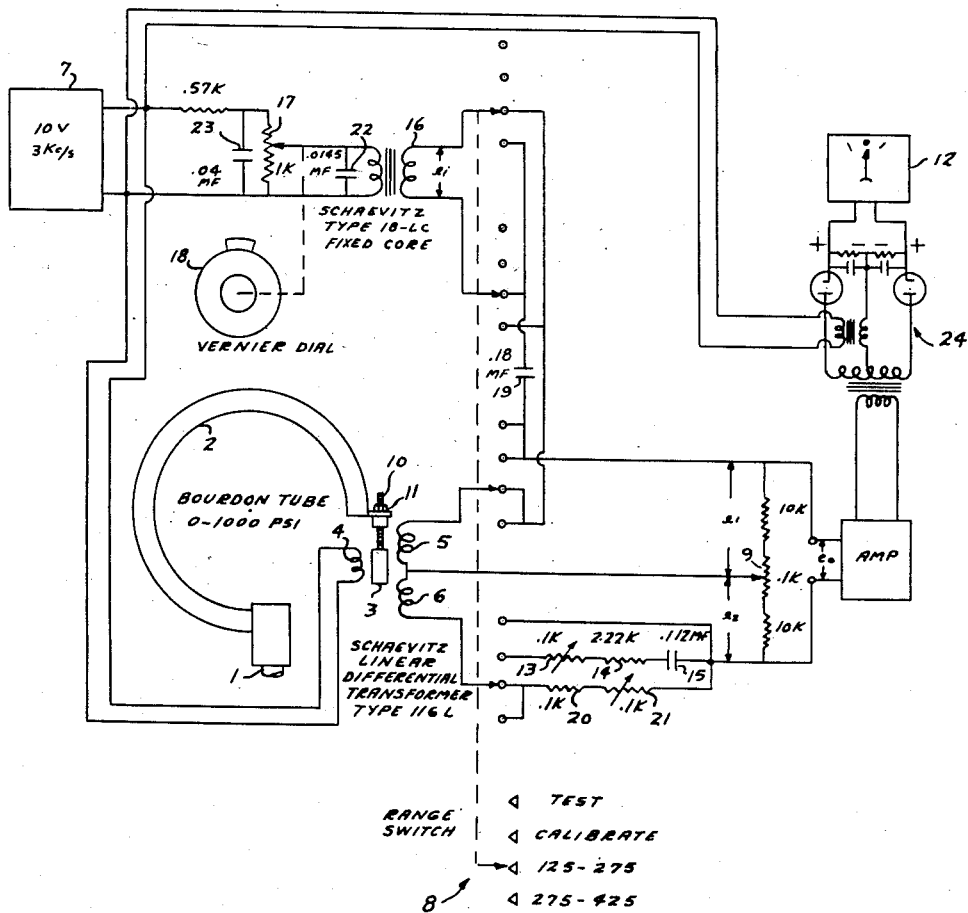

March 25, 1958 F. B. KROEGER 2,827,787
VARIABLE NULL CIRCUIT FOR MOTION PICKUPS
Filed Nov. 27, 1956 2 Sheets-Sheet 1

INVENTOR.
FRANK B. KROEGER
BY
ATTORNEY and
AGENT

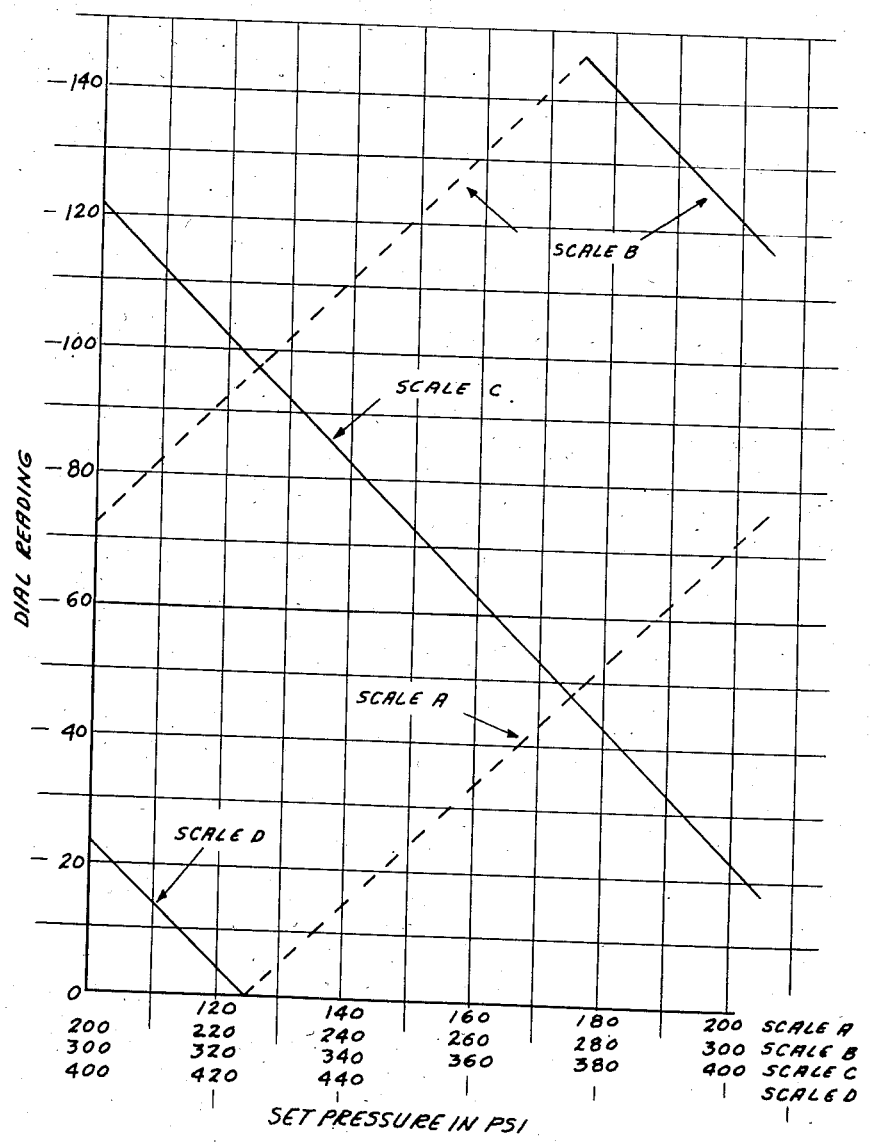

United States Patent Office 2,827,787
Patented Mar. 25, 1958

2,827,787

VARIABLE NULL CIRCUIT FOR MOTION PICKUPS

Frank B. Kroeger, Columbus, Ohio, assignor to the United States of America as represented by the Secretary of the Air Force Application November 27, 1956, Serial No. 624,710

6 Claims. (Cl. 73—398)

This invention relates to motion pickups, particularly those involving the use of a linear differential transformer.

It is the object of the invention to provide for establishing a null at any position within the range of the motion pickup. Briefly this is accomplished by injecting an alternating voltage in series with one output of the differential transformer, this voltage being adjustable in amplitude and reversible in phase in order to increase or decrease the output of the differential transformer by the amount required to balance the other output or produce a null. The device may be used to accurately measure the position of the motion pickup or to monitor a selected position of the pickup.

The invention will be more fully described in connection with the specific embodiment thereof shown in the accompanying drawings, in which Fig. 1 is an embodiment of the invention as applied to the measurement of pressure; and Fig. 2 is a set of calibration curves for Fig. 1.

Referring to Fig. 1, pressure to be measured is applied to pressure inlet 1 of a Bourdon tube 2 which actuates core 3 of a differential transformer having primary winding 4 and secondary windings 5 and 6. The primary winding 4 is energized from source 7, in this case at 10 volts and 3000 c./s. The coupling between primary 4 and secondaries 5 and 6 is controlled by the position of core 3. When the core is in its central or neutral position the couplings to the two secondaries are equal and, as a result, the secondary output voltages are equal. If the core is moved upward, the coupling to secondary 5 increases while that to secondary 6 decreases with corresponding increases and decreases in secondary voltages. Similarly movement of core 3 below its neutral position increases the voltage across secondary 6 and decreases that across secondary 5. The secondary windings are so poled that the secondary voltages are in phase opposition.

The particular embodiment shown is assembled for a pressure of 275 p. s. i. at the neutral point or null of the differential transformer. With range switch 8 in the Test position and 275 p. s. i. pressure on the Bourdon tube, the initial adjustment is made by changing the position of core 3, as by threaded rod 10 and lock nut 11, and potentiometer 9 until $e_0=0$ as indicated by galvanometer 12. This occurs when $e_1$ and $e_2$, which are in phase opposition, are equal.

A second adjustment is also provided, the purpose of which is to provide a null reference for the amplifier with atmospheric pressure on the Bourdon tube. This adjustment should be made immediately after the preceding adjustment with the range switch in its Calibrate position and with atmospheric pressure admitted to the Bourdon tube. With atmospheric pressure on the Bourdon tube, core 3 will rest below its neutral position and as a result the secondary 6 voltage will exceed the secondary 5 voltage. In the Calibrate position of the range switch a network consisting of resistors 13, 14 and condenser 15 is connected in series with secondary 6. Resistors 13 and 14 of this network reduce $e_2$ to a value below the secondary 6 voltage and to near equality with $e_1$. The final adjustment is made by varying resistors 13 until $e_2=e_1$, or $e_0=0$, as indicated by galvanometer 12. The purpose of condenser 15 is to preserve the phase opposition of $e_1$ and $e_2$ by correcting for the phase shift of $e_2$ that would otherwise occur due to the inductance of resistors 13 and 14 and the change in inductance of the secondaries 5 and 6.

The Calibrate position provides a convenient way to check, at atmospheric pressure, for a change in the initial adjustment of the instrument, it not being practical to apply an accurate 275 p. s. i., or other neutral point pressure, to the instrument each time the calibration is checked. If, as described above, the instrument is adjusted for a null in the Calibrate position, with atmospheric pressure, immediately after the initial adjustment of core 3 in the Test position with the prescribed neutral point pressure, the presence of a null in the Calibrate position at a later time is an indirect indication that no change has occurred in the initial adjustment of the instrument, for a change in the initial adjustment would also result in a new position of the core at atmospheric pressure and would not give a null in the Calibrate position.

The range switch provides two pressure measurement ranges, namely, 125–275 p. s. i. and 275–425 p. s. i. Fig. 1 shows the switch in the lower range. Since pressures in this range are below the assembled null pressure of 275 p. s. i., core 3 will be below its neutral position throughout the range and the secondary 6 voltage will exceed the secondary 5 voltage. In order to establish a null or zero reading at galvanometer 12 at any pressure in this range it is necessary to bring $e_1$ into equality with $e_2$ by adding to the secondary 5 voltage an in-phase injection voltage $e_1$ of appropriate amplitude. This voltage is derived from the secondary of isolation transformer 16 the primary of which is energized from source 7 through adjustable potentiometer 17. The potentiometer is actuated by vernier dial 18 and, through controlling the primary voltage of the transformer, regulates the amplitude of $e_1$. Resistors 20 and 21 compensate for the resistance of transformer 16 introduced in series with secondary 5. Condensers 19, 22 and 23 compensate for the inductance of transformer 16, the inductance of potentiometer 17 and the change in inductance of the secondaries 5 and 6. With 275 p. s. i. pressure on the Bourdon tube, range switch 8 in the 125–275 p. s. i. position and the adjustable potentiometer 17 at the position of zero input to transformer 16; condenser 19 is adjusted for 180° phase relationship between $e_1$ and $e_2$. Pressure on the Bourdon tube is then reduced to 200 p. s. i., potentiometer 17 adjusted for null and condenser 23 adjusted for correct phase angle between $e_1$ and $e_2$. Condenser 22 is adjusted with 125 p. s. i. pressure on the Bourdon tube. The vernier dial 18 is then calibrated for pressure from 125 to 275 p. s. i.

Variation of the null throughout the 275–425 p. s. i. pressure range is accomplished in a similar manner. In this range the position of core 3 is above its neutral position and the secondary 5 voltage exceeds the secondary 6 voltage. Therefore it is necessary to reduce the secondary 5 voltage in order to obtain equality between $e_1$ and $e_2$. To accomplish this the range switch in the 275–425 position reverses the phase of $e_1$ so that $e_1$ equals the difference between the secondary voltage and $e_1$ rather than the sum of these voltages as in the lower range. This phase reversal of $e_1$ does not change the inductance of the transformer 16, the inductance of potentiometer 17 or the change in inductance of the secondaries 5 and 6, therefore, values of condensers 19, 22 and 23 obtained for the 125 to 275 p. s. i. range also apply to the 275 to 425 p. s. i. range.

The purpose of condensers 22 and 23 is to correct for the phase shifts introduced by transformer 16 and the inductance of potentiometer 17, respectively, the object being to maintain an exact 0° or 180° phase relationship (depending upon range switch wiring) between $e_1$ and the secondary 5 voltage. Condenser 23 may be omitted if potentiometer 17 is noninductively wound.

As seen above, the null can be shifted to any pressure within the range 125–425 p. s. i. by proper adjustment of range switch 8 and dial 18. Fig. 2 gives a calibration of dial 18 for a circuit employing the transformers and circuit values specified in Fig. 1. The pressure can be determined from Fig. 2 by observing the settings of dial 18 and switch 8 for which a null on meter 12 is produced. A given pressure may be monitored by setting dial 18 and switch 8 in acordance with Fig. 2 and observing variations from a null or zero indication on meter 12.

Meter 12 has been shown as a zero center device utilized in conjunction with phase sensitive detector 24. With this arrangement a null ($e_0=0$) is indicated by a zero reading of meter 12. When $e_0 \neq 0$ the resulting right or left indication of the meter, which actually is an indication of whether the phase of $e_0$ is the same as or opposite to the power supply phase, shows whether the pressure on the Bourdon tube is above or below the value represented by the setting of dial 18. A simpler null indicator showing only the presence or absence of an output from the amplifier could be used to set the circuit to a null condition, however, the direction of the error would not be indicated.

Although the invention has been described in connection with the measurement of pressure, it is basically a device for indicating or monitoring the position of core 3. Therefore it is immaterial how the core is driven and its movement may be made proportional to any quantity that it is desired to measure or monitor. The Calibrate circuit may not be necessary in all cases but may be used where the assembled null is not at zero value of the quantity being measured and where changes in ambient conditions can affect the position of core 3. Its use has already been described in the measurement of pressure. The measurement of temperature is another example where its use may be desirable.

I claim:

1. A variable null circuit comprising a differential network having an input circuit and two output circuits and a movable element for differentially controlling the coupling between the input circuit and the output circuits in accordance with its position, said movable element being displaceable from a neutral position in which the couplings between the input circuit and the output circuits are equal; means for displacing said movable element to either side of its neutral position in accordance with a quantity to be measured; means for applying a first alternating voltage of constant amplitude and frequency to said input circuit; means for producing a second alternating voltage having one of the two phase angles 0° and 180° relative to said first alternating voltage; means for vectorially adding said second alternating voltage to the alternating voltage appearing in one of said output circuits due to its coupling to said input circuit to form a sum voltage; means for indicating the difference between said sum voltage and the voltage in the other of said output circuits; and means for controlling the amplitude of said second voltage and means for selectively reversing its phase for reducing said difference to zero.

2. A variable null circuit comprising a differential transformer having a primary winding, two secondary windings and a movable core for differentially controlling the coupling between the primary winding and the secondary windings in accordance with its position, said core having a neutral position in which the couplings between the primary winding and the secondary windings are equal; means for displacing said core to either side of its neutral position in accordance with a quantity to be measured; a source of alternating voltage of constant amplitude and frequency; a second transformer; circuit means for energizing the primary of said differential transformer from said source; circuit means including a voltage amplitude controlling means for energizing the primary of said second transformer from said source; means including a selectively operable polarity reversing switch for connecting the secondary of said second transformer in series with one of the secondaries of said differential transformer, whereby the vector sum of the second transformer secondary voltage and the differential transformer secondary voltage appears across said series connection; means for deriving the difference between said vector sum voltage and the voltage across the other secondary of said differential transformer; and means for indicating the magnitude of said difference voltage.

3. Apparatus as claimed in claim 2 in which the last-named means also operates to indicate the phase of said difference voltage.

4. Apparatus as claimed in claim 2 in which a capacitor having a reactance equal to the second transformer secondary reactance at said source frequency is connected in series with the second transformer secondary winding and in which a resistance equal to the second transformer secondary resistance is connected in series with the said other secondary of said differential transformer.

5. A pressure measuring apparatus comprising a differential transformer having a primary winding, two secondary windings and a movable core for differentially controlling the coupling between the primary winding and the secondary windings in accordance with its position, said core having a neutral position in which the couplings between the primary and the secondary windings are equal; a pressure sensitive device coupled to said core for moving said core in accordance with the pressure on said device, the coupling to said core providing means for adjusting the core to its neutral position at a predetermined pressure within the range of measurable pressures, a source of alternating voltage of constant amplitude and frequency; a second transformer; circuit means for energizing the primary of said differential transformer from said source; circuit means including a voltage amplitude controlling means for energizing the primary of said second transformer; means for deriving the difference between two alternating voltages and means coupled thereto for indicating the magnitude of said difference; a range switch having four positions; said switch in its first position applying said differential transformer secondary voltages directly to said difference deriving means; in its second position applying one of said differential transformer secondary voltages directly to said difference deriving means and the other secondary voltage to said difference deriving means through means for reducing said voltage to equality with said one secondary voltage with atmospheric pressure on said pressure sensitive means; in its third position applying both of the differential transformer voltages and said second transformer secondary voltage to said difference deriving means, said second transformer voltage being applied in series with one of said differential transformer secondary voltages; and in its fourth position repeating the connections of the third position with the phase of the second transformer secondary voltage reversed.

6. A pressure measuring apparatus comprising a differential transformer having a primary winding, two secondary windings and a movable core for differentially controlling the coupling between the primary winding and the secondary windings in accordance with its position, said core having a neutral position in which the couplings between the primary and the secondary windings are equal; a pressure sensitive device coupled to said core for moving said core in accordance with the pressure on said device, the coupling to said core providing means for adjusting the core to its neutral position at a predetermined pressure within the range of measurable pressures, a source of alternating voltage of constant amplitude and frequency; a second transformer; circuit means for energizing the primary of said differential transformer from said source; circuit means including a voltage amplitude controlling means for energizing the primary of said second transformer; a potentiometer having an adjustable tap; means connecting together said tap and one of the terminals of each differential transformer secondary; means for indicating the magnitude of an alternating voltage connected across the outer terminals of said potentiometer; a range switch having four positions; said switch in its first position directly connecting the remaining two terminals of said differential transformer secondaries directly to the outer terminals of said potentiometer; in its second position connecting one of said remaining terminals directly to an outer terminal of said potentiometer and the other of said remaining terminals through a resistor to the other outer terminal of said potentiometer, said resistor having such value that the voltage across said potentiometer outer terminals is zero when said pressure sensitive means is subjected to atmospheric pressure; in its third position connecting one of said remaining terminals through a second resistor to one of said potentiometer outer terminals and the other of said remaining terminals through the secondary of said second transformer and a capacitor in series to the other of said potentiometer outer terminals, said second resistor having a value equal to the resistance of said second transformer secondary and said capacitor having a reactance equal to the reactance of said second transformer secondary at said source frequency; and said fourth position repeating the connections of said third position with the polarity of said second transformer secondary reversed.

References Cited in the file of this patent

UNITED STATES PATENTS

| | | |
|---|---|---|
| 2,050,629 | Quereau et al. | Aug. 11, 1936 |
| 2,780,101 | Kinkel | Feb. 5, 1957 |
| 2,794,971 | Hornfeck | June 4, 1957 |